United States Patent [19]

Tasaki

[11] Patent Number: 5,171,092
[45] Date of Patent: Dec. 15, 1992

[54] PRINTING APPARATUS THAT STORES EXTERNALLY SUPPLIED FONTS

[75] Inventor: Shigemitsu Tasaki, Kanagawa, Japan

[73] Assignee: Canon Kabushiki Kaisha, Tokyo, Japan

[21] Appl. No.: 884,233

[22] Filed: May 11, 1992

Related U.S. Application Data

[63] Continuation of Ser. No. 529,728, May 25, 1990, abandoned, which is a continuation of Ser. No. 214,486, Jul. 1, 1988, abandoned.

[30] Foreign Application Priority Data

Jul. 6, 1987 [JP] Japan .................. 62-166945

[51] Int. Cl.$^5$ .................... B41J 5/30
[52] U.S. Cl. ................. 400/121; 400/54; 400/692; 395/110
[58] Field of Search ............ 400/54, 61, 76, 121, 400/692; 395/110, 150

[56] References Cited

U.S. PATENT DOCUMENTS

| | | | |
|---|---|---|---|
| 4,388,010 | 6/1983 | Mott et al. | 400/61 |
| 4,589,785 | 5/1986 | Sato | 400/61 |
| 4,660,998 | 4/1987 | Tsuneki | 400/61 |
| 4,660,999 | 4/1987 | Tsuneki | 400/121 |
| 4,763,281 | 8/1988 | Arakawa | 400/61 |
| 4,826,332 | 5/1989 | Uaki | 400/61 |

FOREIGN PATENT DOCUMENTS

| | | | |
|---|---|---|---|
| 0110632 | 6/1984 | European Pat. Off. | 400/692 |
| 0156579 | 10/1985 | European Pat. Off. | 400/76 |
| 0205767 | 12/1986 | European Pat. Off. | 400/61 |
| 124977 | 9/1981 | Japan | 400/54 |
| 114121 | 7/1983 | Japan | 400/692 |
| 200339 | 11/1984 | Japan . | |
| 68254 | 4/1986 | Japan | 400/692 |
| 173974 | 8/1986 | Japan | 400/61 |
| 114027 | 5/1987 | Japan | 400/54 |
| 167063 | 7/1987 | Japan | 400/54 |
| 256677 | 11/1987 | Japan | 400/61 |
| 205767 | 3/1986 | United Kingdom | 400/121 |

OTHER PUBLICATIONS

I.B.M. Technical Disclosure Bulletin, vol. 13 No. 5, Oct. 1970, pp. 1149-1150.

*Primary Examiner*—David A. Wiecking
*Assistant Examiner*—Steven S. Kelley
*Attorney, Agent, or Firm*—Fitzpatrick, Cella, Harper & Scinto

[57] ABSTRACT

There is disclosed a printer capable of printing different type fonts by means of different font cartridges, in which the loading and unloading of font cartridges are enabled in response to the state of communication between the printer and a host apparatus, and the state of communication is controlled according to the open or closed state of the cover of the printer, whereby different font patterns can be printed continuously on a same sheet.

22 Claims, 11 Drawing Sheets

PRINTING APPARATUS THAT STORES EXTERNALLY SUPPLIED FONTS

This application is a continuation of application Ser. No. 07/529,728 filed May 25, 1990, which is a continuation of U.S. Ser. No. 07/214,486 filed on Jul. 1, 1988, both now abandoned.

BACKGROUND OF THE INVENTION

1. Field of the Invention

The present invention relates to a printing apparatus capable of printing operation utilizing a font cartridge incorporating a font ROM in which a predetermined type font is stored.

2. Related Background Art

Recent remarkable progress in electronic technology has realized commercialization of various electronic appliances such as personal computers and word processors not only to the office market but also to the personal market. For the output from such electronic appliances there are employed printers of various output forms such as wire dot printers, thermal printers, ink jet printers etc.

In such printers, changeable in type fonts have been achieved by employing a detachable font cartridge incorporating a font ROM in which a type font is stored and printing a dot pattern of a desired type style developed into a dot image on a recording sheet, or by printing, on a recording sheet, a dot pattern of a desired typestyle developed into a dot image for example of italic style stored in a specified area of a font ROM incorporated in the printer, in response to the instruction from a host apparatus in either case.

In the above-explained printer utilizing a detachable font cartridge, if said font cartridge is detached from the printer while the power supply is turned on, an erroneous operation may result from the errors in the data on the bus line, since the font data to be printed is stored for example in a memory.

For this reason it has been customary to prevent such erroneous operation by resetting the data processing in the printer when detaching the font cartridge from the printer, or by prohibiting the detaching of the font cartridge while the power supply is turned on.

In printers where the data processing is reset at the detaching of the font cartridge, data and control commands entered before said detachment are inevitably lost, so that it is impossible to effect a continuous printing operation with different type fonts or different font cartridges. It is therefore impossible to continuously print different type styles on a same sheet.

On the other hand, in order to resolve the above-explained drawback with an incorporated font system, it is necessary to increase the number of printable type fonts, leading to a significant increase in the cost of the apparatus.

SUMMARY OF THE INVENTION

The object of the present invention is to prevent the above-explained drawbacks and to provide a printing apparatus for printing by means of a font cartridge designed for each type style, capable of enabling the detaching and attaching of the font cartridge in response to the state of communication between the printing apparatus and a host apparatus, and controlling the state of said communication according to the open or closed state of a cover of the printing apparatus, thereby allowing to continuously print patterns of plural type styles on a same sheet.

DETAILED DESCRIPTION OF THE PREFERRED EMBODIMENTS

Figure 1:
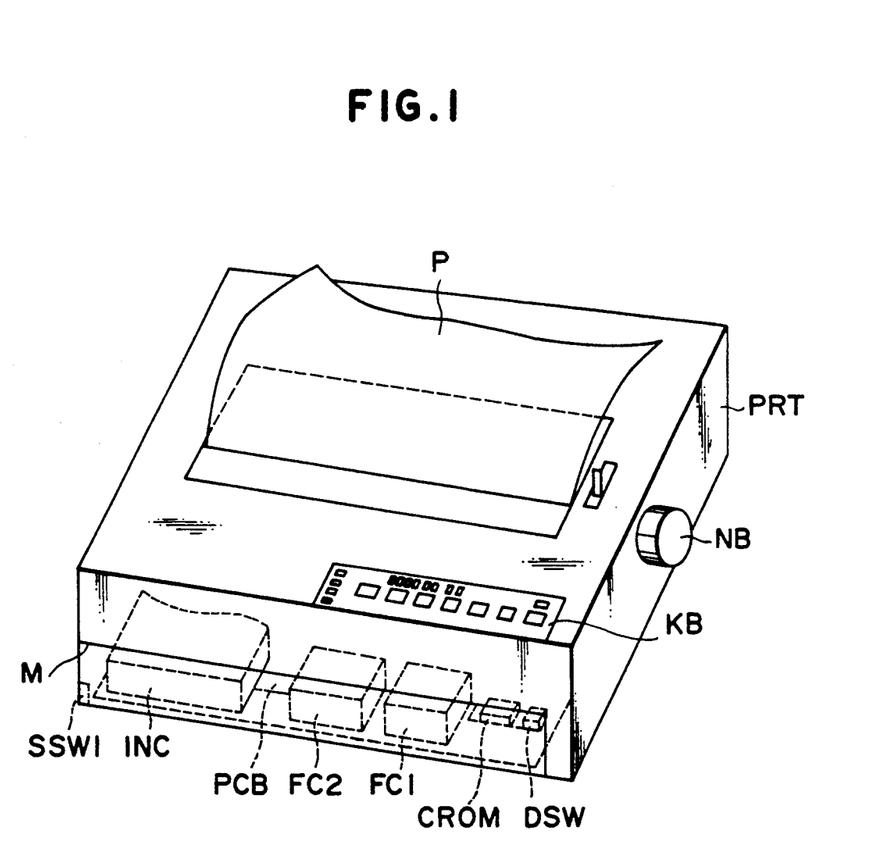
FIG. 1 is an external perspective view of an ink jet printer embodying the present invention.

FIG. 1 is an external perspective view of an ink jet printer constituting an embodiment of the present invention, wherein shown are a main body PRT of the printer; a platen knob NB to be rotated for advancing a recording sheet P; a keyboard KB provided with an LED display unit and various mode selecting keys, including a selection key functioning as line setting means of the present invention; and a front cover M which can be opened or closed in the front direction, thus turning on and off a sensing switch SSW1. A printed circuit board PCB is provided with line switching control means of the present invention and is adapted to shift the printing process in the main body PRT and the data processing communication with the host apparatus from an on-line state to an off-line states, or vice versa, according to the state of the selection key and the on/off state of the sensing switch SSW1. A printer controlling read-only memory CROM stores a control program for the printer PRT. A DIP switch DSW selects various modes. Font cartridges FC1, FC2 storing font patterns of different type styles are detachably connected to the printer PRT through unrepresented connectors. The type styles stored in the font cartridges FC1, FC2 and the type style requested by the host apparatus are rendered identifiable. An ink cartridge INC is housed inside the front cover M.

Figure 2:
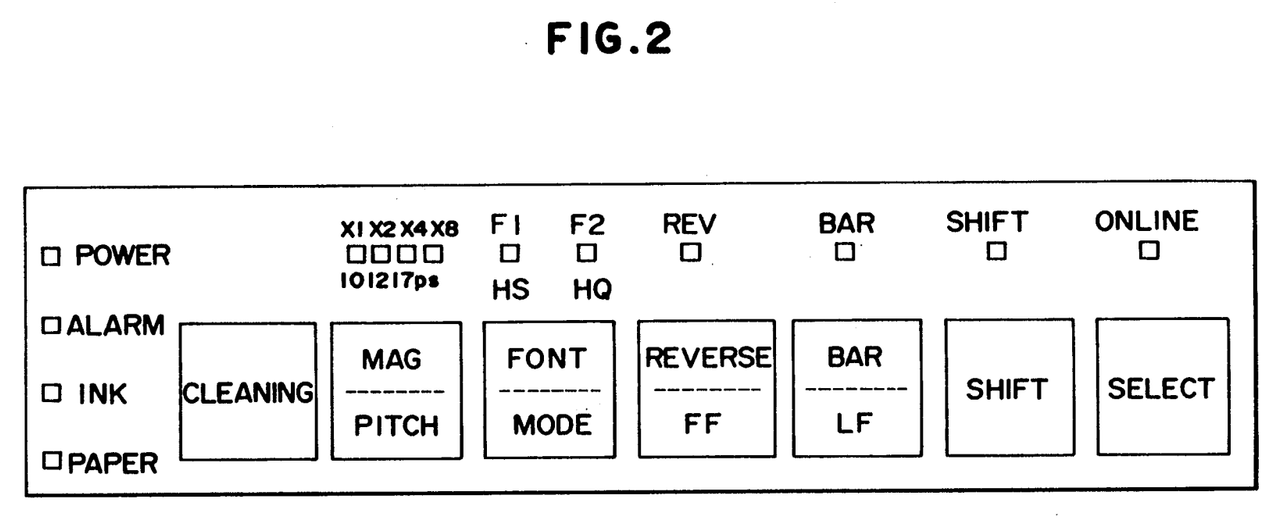
FIG. 2 is a plan view of a keyboard shown in FIG. 1.

FIG. 2 is a plan view of the keyboard KB shown in FIG. 1, in which a selection switch SELECT forcedly shifts the data communication process between the printer PRT and the host apparatus (for example exchange of data and commands with a host computer) from an off-line state to an on-line state or from an on-line state to an off-line state. Repeated depressions of the selection switch SELECT causes cyclic changes between the on-line and off-line states. When the on-line state is selected by the selection switch SELECT, an on-line lamp ONLINE composed for example of a light-emitting diode is turned on. A cleaning key CLEANING instructs the cleaning of unrepresented printing nozzles. A font-mode setting key FONT-/MODE selects the font or the mode by the depression of a shift key SHIFT, thus cyclically selecting the font cartridge FC1 or FC2, or a printing mode HS with a high printing speed and an ordinary print quality or another printing mode HQ with a high print quality and an ordinary printing speed.

Figure 3:
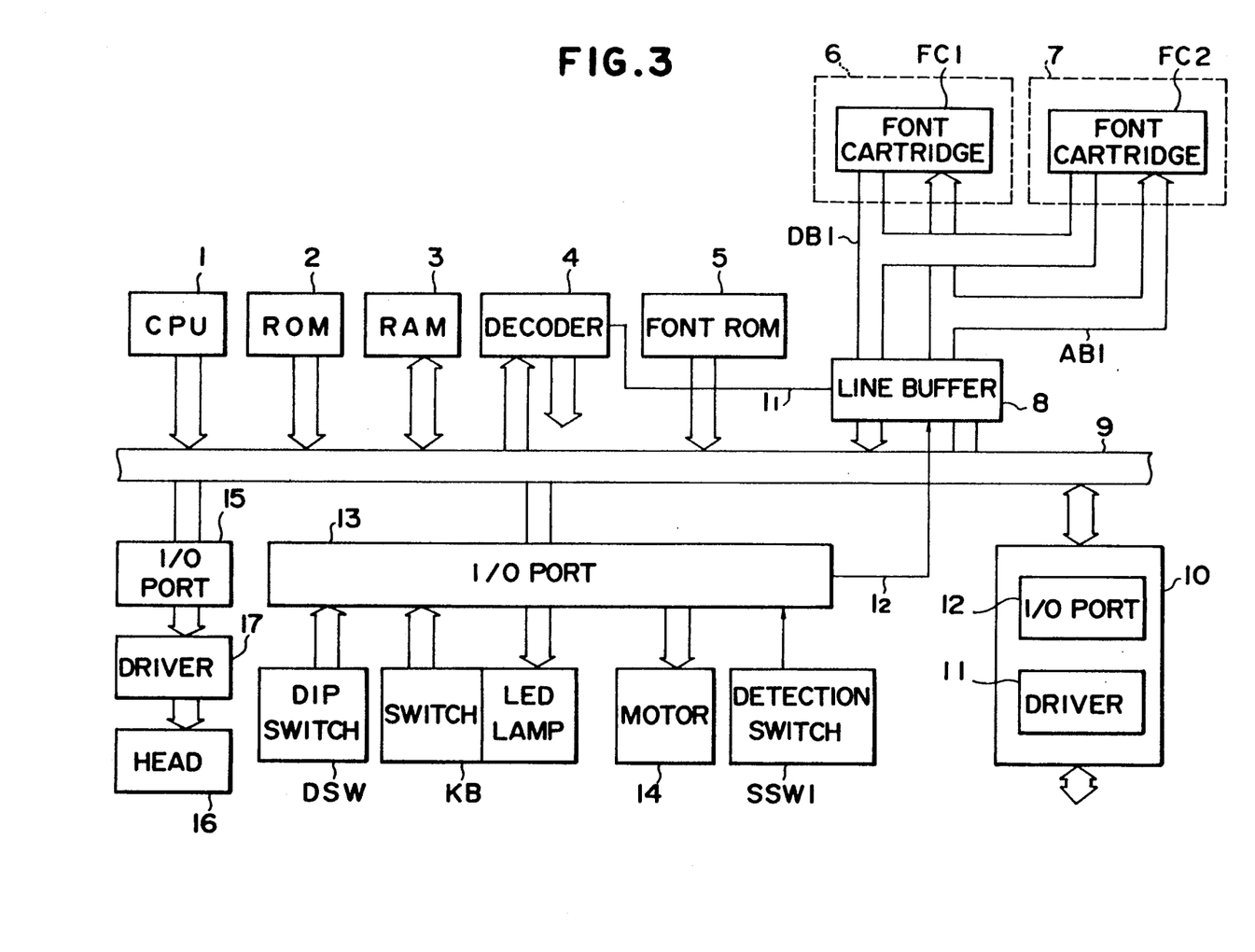
FIG. 3 is a block diagram showing the structure of a printed circuit board shown in FIG. 1.
Figure 4:
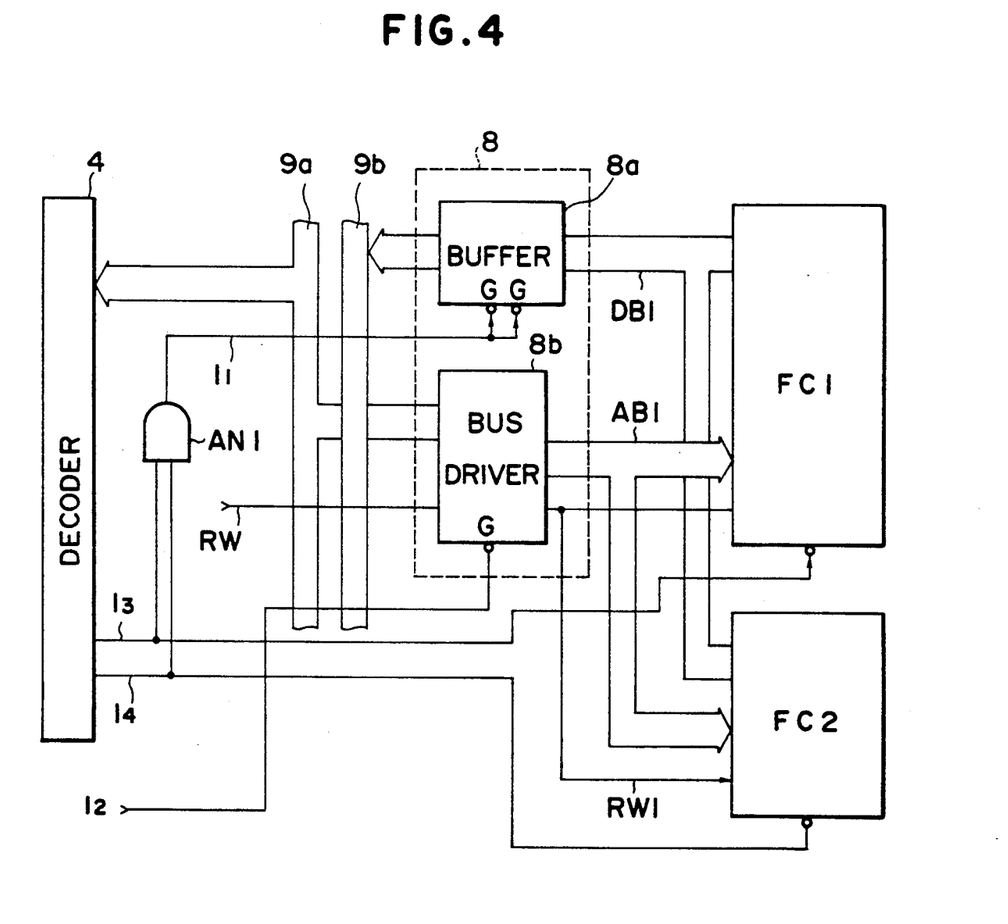
FIG. 4 is a detailed block diagram of a line buffer shown in FIG. 3.
Figure 5A:
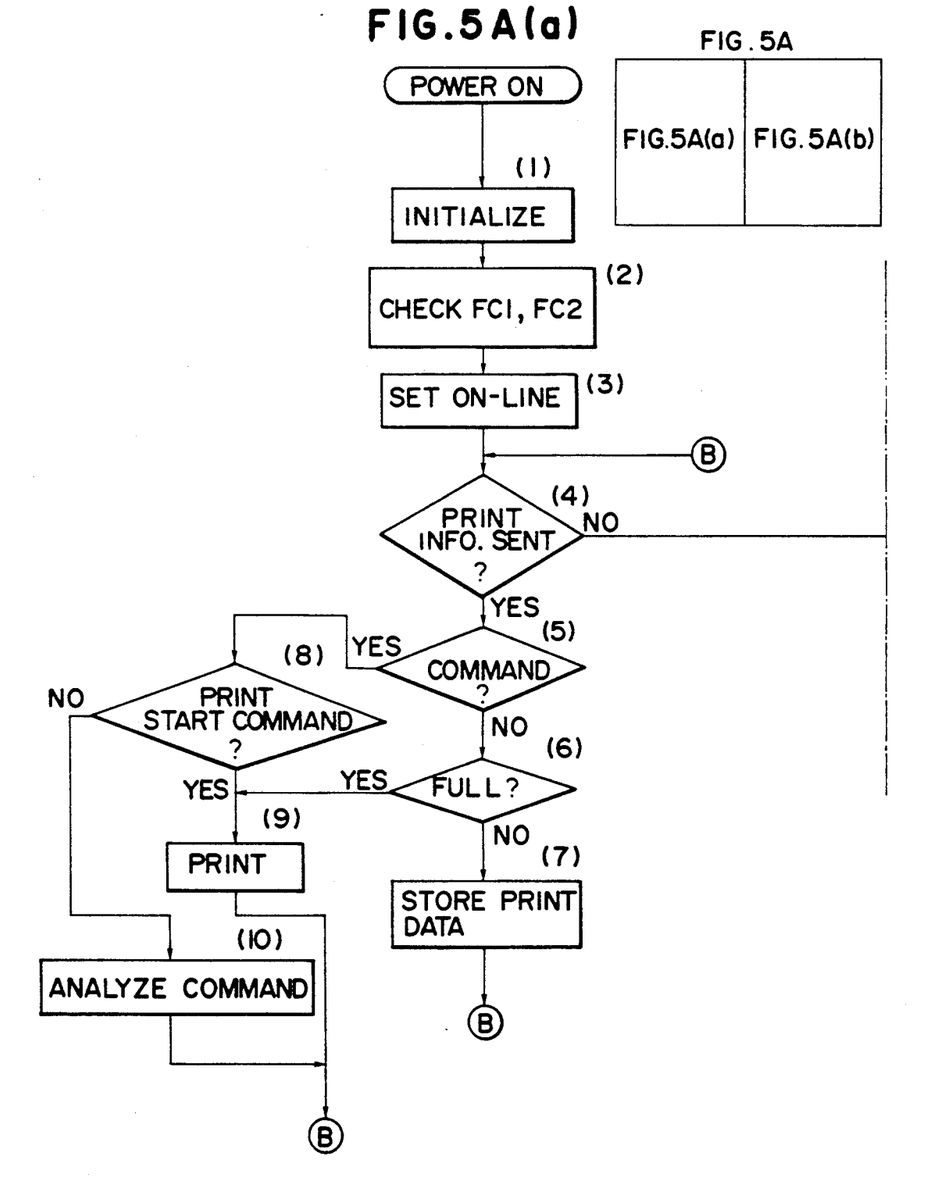
FIGS. 5A, 5A(a), 5A(b), 5B, 5B(a), 5B(b), 5C, 5C(a), 5C(b), 5(c) are flow charts showing the first to third control sequences for on-line/off-line mode switching of the present invention.
Figure 5B:
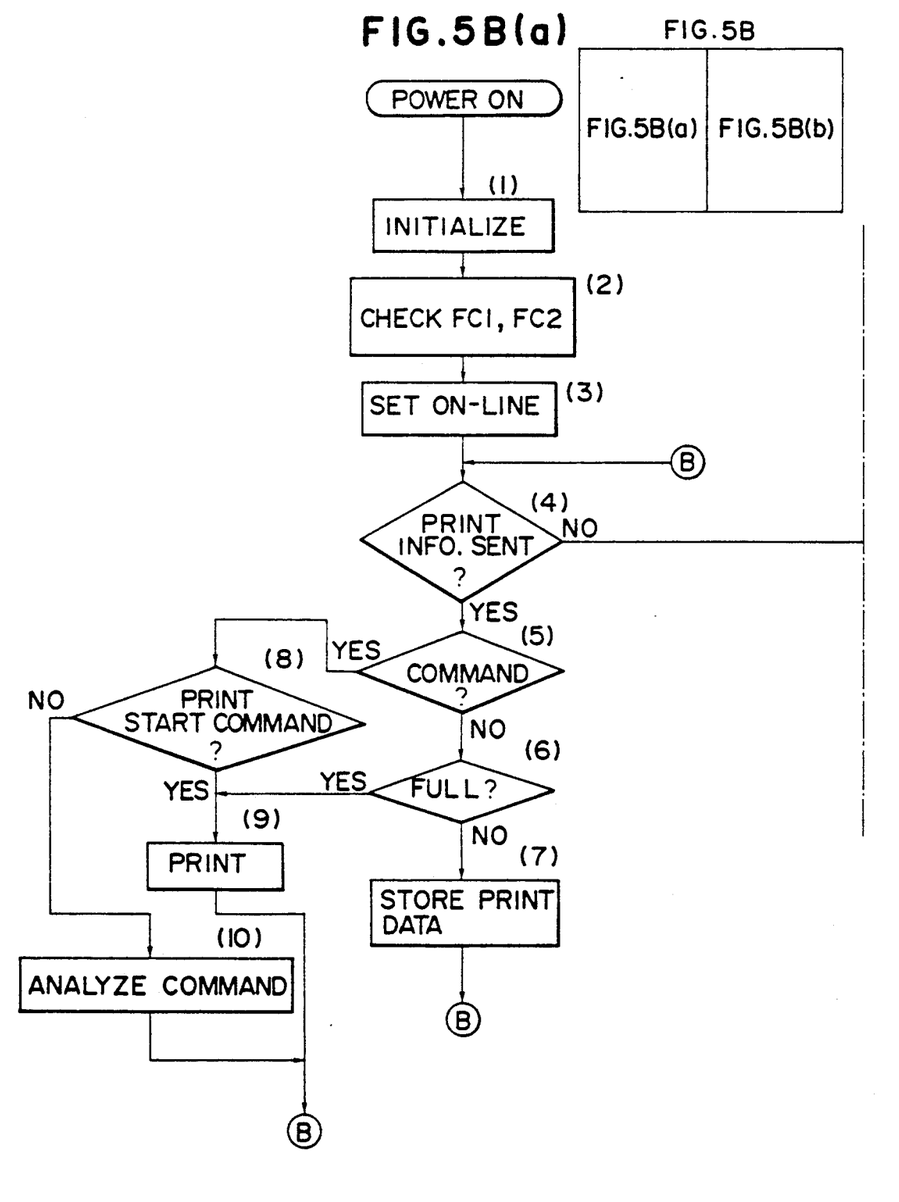
Figure 5C:
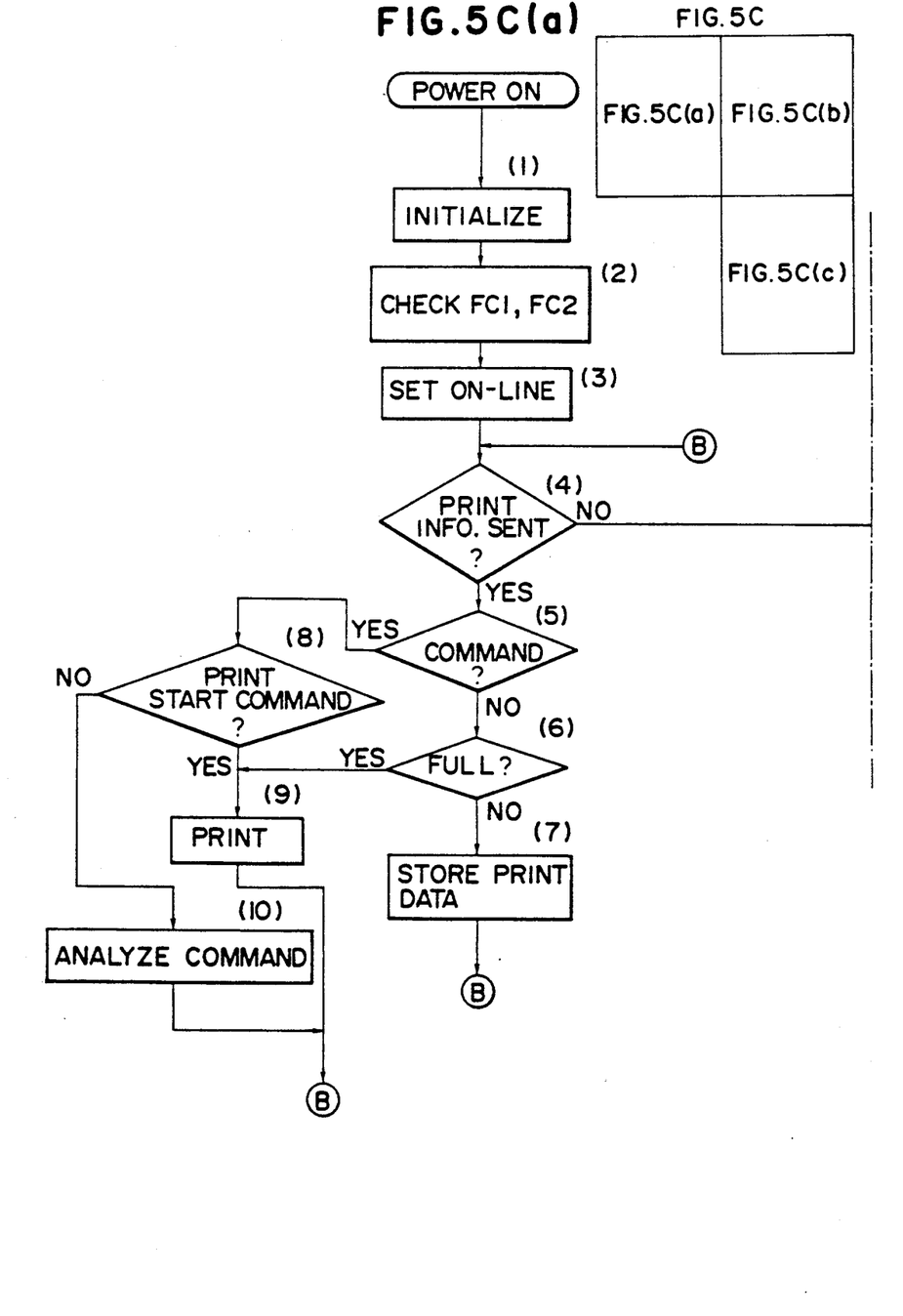

FIG. 3 is a block diagram showing the structure of the printed circuit board PCB shown in FIG. 1, wherein a CPU 1 controls various parts according to a control program stored in a ROM 2, including the control sequences corresponding to the flow chart shown in FIGS. 5A to 5C. A RAM 3 functions as a work memory for the CPU 1, a receiving buffer for storing data and control codes from the host apparatus, and a print buffer for storing dot image for printing. A decoder 4 decodes address information supplied to an address bus 9a to be explained later. An incorporated font ROM 5 stores the font patterns of a predetermined print style. A first font cartridge 6 which is externally mountable and corresponds to the font cartridge FC1 shown in FIG. 1, sends font pattern data of a predetermined type style to a data bus 9b to be explained later, through an internal data bus DB1 shown in FIG. 4 and a line buffer 8. A second font cartridge 7, which is likewise externally mountable and corresponds to the font cartridge FC2 shown in FIG. 1, sends font pattern data of a predetermined type style to the data bus 9b through the internal data bus DB1 and the line buffer 8. An interface 10 is composed of a driver 11 and an I/O port 12 for data exchange with the host computer. An I/O port 13 transmits the switch information from the dip switch DSW shown in FIG. 1, the key-in information from the keyboard KB and the front cover status signal from the sensing switch SSW1 to the CPU 1 and releases display signals to the display unit on the keyboard KB, and driving signals for a motor 14 for driving the platen and the carrier. An I/0 port 15 supplies print driving signals to a driver 17 for energizing a printing head 16.

FIG. 4 is a detailed block diagram of the line buffer 8 shown in FIG. 3, wherein the same components as those in FIG. 3 are represented by same numbers.

In FIG. 4, a buffer 8a is connected to the internal data bus DB1 connected to the font cartridges FC1, FC2, and supplies the character font patterns of different styles read from said font cartridges to a data bus 9b. A bus driver 8b supplies the address information, instructed from the address bus 9a, to the font cartridges FC1, FC2 through an address bus AB1, which is to be hereinafter called, internal address bus AB1. A signal line $l_1$ connects to an AND gate AN1 receiving signal lines $l_3$, $l_4$ from the decoder 4, is connected to a gate terminal G of the buffer 8a composed for example of 74LS244, thus constituting a tri-state gate. A bus driver 8b composed for example of HD74LS367A receives a gate signal from the I/O port 13 through the signal line $l_2$ and an output control terminal G and supplies the address and the read/write control signal RW given to the address bus 9a to the internal address bus AB1. The signal line $l_3$ is connected to the chip selecting terminal of the font cartridge FC1 for effecting chip selection when said signal line is in a state "0". Also the signal line $l_4$ is connected to the chip selecting terminal of the font cartridge FC2 for effecting chip selection when said signal line is in a state "0".

In the following there will be explained the function of the circuits shown in FIGS. 3 and 4. It is assumed that the incorporated font ROM 5 and the font cartridges FC1, FC2 are all mounted.

At first the CPU 1 discriminates whether the font cartridges FC1, FC2 are mounted. More specifically, when the power supply is turned on, the CPU 1 shifts the signal line $l_2$ from the I/O port 13 to the output control terminal G of the bus driver 8b, thereby opening the gate and transmitting the read/write signal RW of the address bus 9a to the internal address bus AB1 as the internal read/write signal RW1, and then to the font cartridges FC1, FC2. At the same time the decoder 4 shifts the signal line $l_3$ to "0" to select the font cartridge FC1. Simultaneously a signal from the AND gate AN1 is supplied through the signal line $l_1$ to the gate terminal G of the buffer 8a to open the tristate gate. The above-mentioned discrimination is made by releasing the font pattern data of the font cartridge FC1 to the data bus 9b, and identifying whether the data of a particular address coincide with predetermined data.

The above-explained discrimination is also conducted for the font cartridge FC2 through the signal lines $l_2$, $l_4$.

When the mounted state of the font cartridges FC1, FC2 is confirmed, the signal line $l_2$ is maintained at a state "0", whereby the address bus 9a is constantly connected to the font cartridges FC1, FC2 through the bus driver 8b. Then the cartridges are selected by a command supplied from the host computer through the interface 10 or a key input from the keyboard KB. In case of reading the font pattern data, either one of the font cartridges FC1, FC2 is selected by the "0" state of the signal line $l_3$ or $l_4$ connected to the decoder 4. Thus the font pattern data are released to the data bus 9b through the buffer 8a maintained open by the output of the AND gate AN1 supplied through the signal line $l_1$, and are used for dot data development in the print buffer.

The selection of the font cartridge FC1 or FC2 can be achieved by depressing the shift key SHIFT and the font/mode setting key FONT/MODE to select the font mode. Thereafter said cartridges are cyclically selected by the repeated depressions of the font/mode setting key FONT/MODE. It is also possible to automatically select the font at the start of power supply according to a predetermined preferential order, for example in the order of font cartridge FC1, cartridge FC2 and incorporated font ROM 5.

In such state, if the operator enters an off-line command to the printer by the depression of the selection key SELECT shown in FIG. 2 or by a control signal from the host apparatus, the CPU 1 discriminates whether the print data is remaining in an unrepresented print buffer, and executes printing operation of said data if such data are remaining, or executes an operation for the detaching and attaching of the font cartridges FC1, FC2 if said data does not exist.

More specifically the CPU 1 sets the signal line $l_2$ to a state "1" through the I/O port 13, thereby shifting the output control terminal G of the bus driver 8b to the high-level state and separating the internal read/write signal RW1 of the internal address bus AB1 of the font cartridges FC1, FC2 from the read/write signal RW of the address bus 9a. Unless chip selection is made for the font cartridge FC1 or FC2, the gate terminal G of the buffer 8a is automatically in a state "1" to separate the data bus 9a of the CPU 1 from the internal data bus DB1 of the font cartridges FC1, FC2, so that, also in such state, the internal address bus AB1, internal data bus DB1 and internal read/write signal RW1 of the font cartridges FC1, FC2 are separated from the address bus 9a, data bus 9b and read/write signal RW (non-connected process).

In the case of a process utilizing the font cartridge FC1 or FC2, the signal lines $l_3$, $l_4$ are shifted to "1" after said process to separate the data bus 9b from the buffer 8a without chip selection. Then the signal line $l_2$ is shifted to "1" to separate the address bus 9a and read/write signal RW from the line buffer 8. Then the interface 10 transmits an off-line state signal, for example a BUSY signal, to the host computer and turns off the on-line lamp ONLINE on the keyboard KB, thereby informing the operator of a fact that the off-line state is started.

In such off-line state, the signal lines $l_3$, $l_4$ are in the state "1" as explained above whereby the font cartridges FC1, FC2 are not subjected to chip selection, and the address bus 9a and the data bus 9b are separated from the internal address bus AB1 and the internal data bus DB1 of the font cartridges FC1, FC2.

In such state the detaching and attaching of the font cartridges FC1, FC2 can be safely carried out, since eventual fluctuation of the signal level in such operations does not affect the address bus 9a and the data bus 9b.

On the other hand, in case of a printer requiring the opening and closing of the front cover M for the detaching and attaching of the font cartridges FC1, FC2, the CPU 1 monitors the opening/closing operation of the front cover M by means of the on/off signal from the sensing switch SSW1 supplied through the I/O port 13 during the on-line state, and automatically executes the above-explained non-connected process after the completion of data processing utilizing the font cartridges FC1, FC2, thereby separating the internal address bus AB1, internal data bus DB1 and internal read/write signal RW1 of said font cartridges from the address bus 9a, data bus 9b and read/write signal RW and thus enabling the detaching and attaching of the font cartridges. In the present embodiment utilizing an ink jet printer, the front cover M is inevitably opened and closed at the replacement of the ink cartridge INC. At such opening and closing operation, the address bus 9a, data bus 9b and read/write signal RW are separated to interrupt the printing operation.

Also when the selection switch SELECT is depressed after the closing of the front cover M to shift the off-line state to the on-line state, the mode setting by the dip switch DSW is transmitted to the CPU 1.

A shift from the off-line state to the on-line state can be achieved by a depression of the selection switch SELECT of by a command from the host computer.

In response, the CPU 1 terminates the BUSY signal to the interface 10, thereby terminating the busy state and turning on the on-line lamp ONLINE. If the font cartridges FC1, FC2 are identified mounted through the above-explained discrimination, the gate terminal G of the line buffer 8 is controlled to enable connection of the internal address bus AB1, internal data bus DB1 and internal read/write signal RW1 of the font cartridges with the address bus 9a, data bus 9b and read/write signal RW.

The switching of the connected (on) state and the non-connected (off) state at the replacement of the font cartridges enables to print the type style before said replacement and that after replacement either on a same line or on different lines.

When the front cover M is opened, the on-line state is switched to the off-line state. Then when the CPU 1 detects, through the I/O port 13, the signal of the sensing switch SSW1 indicating the closing of the front cover M (sensing flag SSW=0), the CPU 1 automatically changes the off-line state to the on-line state, thereby terminating the busy state of the interface 10 and turning on the on-line lamp ONLINE. Upon identification of the mounting of the font cartridges FC1, FC2, the gate terminal G of the line buffer 8 is controlled to enable connection of the internal address bs AB1, internal data bus DB1 and internal read/write signal RW1 of the font cartridges FC1, FC2 with the address bus 9a, data bus 9b and read/write signal RW.

In the following there will be explained the on-line/off-line switching operation of the present invention, while making, reference to the flow charts shown in FIGS. 5(a) to 5(c).

FIG. 5(a) shows a first control sequence for the on-line/off-line switching of the present invention, wherein (1) to (23) indicate different steps.

At first the CPU 1 executes a predetermined initialization procedure (1), then checks the mounted state of the font cartridges FC1, FC2 (2), and connects the addresses of the font cartridges thereby establishing the on-line state with the host computer (3). In this state the internal address bus AB1 and internal read/write signal RW1 are respectively connected with the address bus 9a and read/write signal RW. Then the CPU 1 discriminates whether print information has been released from the host computer (4), and, if affirmative, it discriminates whether said print information is a command (5). If not, the CPU 1 discriminates whether the print buffer is full (6), and, if affirmative, the sequence proceeds to the printing operation in step (9), or, if not, the received print data is stored in succession into the print buffer (7) and the sequence returns to the step (4).

On the other hand, if the discrimination in the step (5) turns out affirmative, the CPU 1 discriminates whether the received command is the print start command, and, if affirmative, the printing operation is executed (9) and the sequence returns to the step (4). On the other hand, if negative, a command decoding is executed (10) and the sequence returns to the step (4).

If the discrimination in the step (4) turns out negative, the CPU 1 checks the key-in information from the keyboard KB (11), then discriminates whether the on-line flag (in RAM 3) is in the state "1" (12), and, if affirmative, discriminates whether the selection key SELECT has been depressed (13). If depressed, the sequence proceeds to a step (18). If not depressed, the CPU 1 discriminates whether data remain in the print buffer (14), and, if not, the sequence proceeds to a step (16). On the other hand, if data remain in the print buffer, the printing operation is executed (15). Also the chip selecting terminal G of the font cartridges FC1, FC2 are shifted to "1", and the output control terminal G of the bus driver 8b is shifted to "1" to close the gate, thereby setting the internal data bus DB1, internal address bus AB1, address bus 9a, data bus 9b and read/write signals RW, RW1 in the off-line state and clearing the on-line flag to "0" (16). Also the on-line lamp ONLINE is turned off (17). The other key data processing is executed (18), and the sequence returns to the step (4).

On the other hand, if the discrimination in the step (12) turns out negative, there is discriminated whether the selection key SELECT has been depressed (19), and, if not, the sequence returns to the step (18). On the other hand, if depressed, the addresses of the font cartridges are connected and the on-line flag is set to "1" (20). Then the busy state of the interface 10 is cancelled, and the on-line lamp ONLINE is turned on to establish the on-line state (21). Then there is discriminated whether the font cartridges FC1, FC2 are mounted (22), and, if not, the sequence returns to the step (4). If mounted, the output control terminal G of the bus driver 8b is shifted to "0" to open the gate, and, when the font cartridge is selected by the subsequent CPU process, the signal lines $l_3$, $l_4$ are shifted to "0" to achieve chip selection whereby the contents of the font cartridges FC1, FC2 are connected with the data bus (23). Then the sequence returns to the step (4).

FIG. 5B shows a second control sequence for the on-line/off-line switching of the present invention, wherein (1) to (25) indicate different steps.

At first the CPU 1 executes a predetermined initialization procedure (1), then checks the mounted state of the font cartridges FC1, FC2. (2), and connects the addresses of the font cartridges thereby establishing the on-line state with the host computer (3). Then the CPU 1 discriminates whether print information has been released from the host computer (4), and, if affirmative, i discriminates whether said print information is a command (5). If not, the CPU 1 discriminates whether the print buffer is full (6), and, if affirmative, the sequence proceeds to the printing operation in a step (9), or, if not, the received print data are stored in succession into the print buffer (7) and the sequence returns to the step (4).

On the other hand, if the discrimination in the step (5) turns out affirmative, the CPU 1 discriminates whether the received command is the print start command, and, if affirmative, the printing operation is executed (9) and the sequence returns to the step (4). On the other hand, if negative, a command decoding is executed (10) and the sequence returns to the step (4).

On the other hand, if the discrimination in the step (4) turns out negative, there is discriminated whether the sensing switch SSW1 is on (11), and, if not, namely if the front cover M is closed, the sequence proceeds to a step (13). If said switch is on, a reading process of the dip switch DSW is executed (12) and the sequence proceeds to the step (16).

If the discrimination in the step (11) turns out negative, the CPU 1 checks the key-in information from the keyboard KB (13), then discriminates whether the on-line flag (in RAM 3) is in the state "1" (14), and, if so, it discriminates whether the selection key SELECT has been depressed (15). If depressed, the sequence proceeds to a step (20). If not depressed, the CPU 1 discriminates whether data remain in the print buffer (16), and, if not, the sequence proceeds to a step (18). On the other hand, if data remain in the print buffer, the printing operation is executed (17). Also the chip selecting terminal G of the font cartridges FC1, FC2 are shifted to "1", and the output control terminal G of the bus driver 8b is shifted to "1" to close the gate, thereby setting the internal data bus DB1, internal address bus AB1, address bus 9a and data bus 9b in the off-line state and clearing the on-line flag to "0" (18). Also the on-line lmap ONLINE is turned off (19). Then other key/data processing is executed (20) and the sequence returns to the step (4).

On the other hand, if the discrimination in the step (14) turns out negative, there is discriminated whether the selection key SELECT has been depressed (21), and, if not, the sequence returns to the step (20). On the other hand, if depressed, the addresses of the font cartridges are connected and the on-line flag is set to "1" (22). Then the busy state of the interface 10 is cancelled, and the on-line lamp ONLINE is turned on to establish the on-line state (23). Then there is discriminated whether the font cartridges FC1, FC2 are mounted (24), and, if not, the sequence returns to the step (4). If mounted, the output control terminal G of the bus driver 8b is shifted to "0" to open the gate, and, when the font cartridge is selected by the subsequent CPU process, the signal lines l3, l4 are shifted to "0" to achieve chip selection whereby the contents of the font cartridges FC1, FC2 are connected with the data bus (25). Then the sequence returns to the step (4).

FIG. 5C shows a third control sequence for the on-line/off-line switching of the present invention, wherein (1) to (30) indicate different steps.

At first the CPU 1 executes a predetermined initialization procedure (1), then checks the mounted state of the font cartridges FC1, FC2 (2), and connects the addresses of the font cartridges thereby establishing the on-line state with the host computer (3). Then the CPU 1 discriminates whether print information has been released from the host computer (4), and, if released, it discriminates whether said print information is a command (5). If not, the CPU 1 discriminates whether the print buffer is full (6), and, if so, the sequence proceeds to the printing operation in a step (9), or, if not, the received print data is stored in succession into the print buffer (7) and the sequence returns to the step (4).

On the other hand, if the discrimination in the step (5) turns out affirmative, the CPU 1 discriminates whether the received command is the print start command, and, if so, the printing operation is executed (9) and the sequence returns to the step (4). On the other hand, if not, a command decoding is executed (10) and the sequence returns to the step (4).

On the other hand, if the discrimination in the step (4) turns out negative, there is discriminated whether the sensing switch SSW1 is on (11), and, if not, namely if the front cover M is closed, the sequence proceeds to a step (13). If said switch is on, a reading process of the dip switch DSW is executed (12) and the sequence proceeds to the step (16).

If the discrimination in the step (11) turns out negative, the CPU 1 checks the key-in information from the keyboard KB (13), then discriminates whether the on-line flag (in RAM 3) is in the state "1" (14), and, if so, it discriminates whether the selection key SELECT has been depressed (15). If depressed, the sequence proceeds to a step (20). If not depressed, the CPU 1 discriminates whether data remain in the print buffer (16), and, if not, the sequence proceeds to a step (18). On the other hand, if data remain in the print buffer, the printing operation is executed (17). Also the chip selecting terminal G of the font cartridges FC1, FC2 are shifted to "1", and the output control terminal G of the bus driver 8b is shifted to "1" to close the gate, thereby setting the internal data bus DB1, internal address bus AB1, address bus 9a and data bus 9b in the off-line state and clearing the on-line flag to "0" (18). Then the on-line lamp ONLINE is turned off (19), and other key/data processing is executed (20). Then there is discriminated whether the sensing switch SSW1 is "0" (21), and, if not, the sequence returns to the step (4). If it is "0", the addresses of the font cartridges are connected and the on-line flag is set to "1" (22). Then the busy state of the interface 10 is cancelled, and the on-line lamp ONLINE is turned on (23). Then there is discriminated whether the font cartridges FC1, FC2 are mounted (24), and, if not, the sequence returns to the step (4). If mounted, the output control terminal G of the bus driver 8b is shifted to "0" to open the gate, and, when the font cartridge is selected by the subsequence CPU process, the signal lines l3, l4 are shifted "0" to achieve chip selection whereby the contents of the font cartridges FC1, FC2 are connected with the data bus (25). Then the sequence returns to the step (4).

On the other hand, if the discrimination in the step (14) turns out negative, there is discriminated whether the selection key SELECT has been depressed (26), and, if not, the sequence returns to the step (20). If depressed, the addresses of the font cartridges are connected, and the on-line flag is set to "1" (27). Then the busy state of the interface 10 is cancelled, and the on-line lamp ONLINE is turned on (28). Then there is discriminated whether the font cartridges FC1, FC2 are mounted (29), and, if not, the sequence returns to the step (4). If mounted, there is executed the above-mentioned font cartridge control process in which the output control terminal G of the bus driver 8b is set at "1" to open the gate (30), and the sequence returns to the step (4).

As explained in the foregoing, the present invention is featured by the presence of line setting means for forcedly establishing an on-line state or an off-line state in the data communication line with a host apparatus in the course of print data processing, and switching control means for monitoring the line state established by said line setting means and varying the reading operation of type font data stored in plural font cartridges from non-connected state to connected state or from connected state to non-connected state. It is therefore rendered possible, in the course of a printing operation of the printer based on the print information received from said host apparatus, to interrupt the printing operation at an arbitrary line, to effect the reading of the print font data in the non-connected state, to replace the font cartridges with other desirable ones and to automatically restore the connected on-line state thereafter, thereby printing different type styles in exactly continuously manner on a same sheet, without the loss of print data. Also the reading operation of the print font data can be automatically carried out in relation to a switch operation for printing operation or an opening or a closing of the cover for inspecting the printing unit, whereby a significant improvement in the printing efficiency can be achieved.

What is claimed is:

1. A printing apparatus for receiving print data from a host apparatus and printing the print data based on print font data stored in a detachable font cartridge, said apparatus comprising:
   line setting means for forcedly establishing an on-line state or an off-line state in the data communication with the host apparatus in the course of processing of the print data in communication with the host apparatus; and
   switching control means for storing the print font data previously supplied from a detachable font cartridge and for enabling said apparatus to release or receive the font cartridge when the line state is changed by said line setting means from the on-line state to the off-line state, and for causing the stored print font data to be again used when the line state is changed by said line setting means from the off-line state to the on-line state.

2. A printing apparatus according to claim 1, wherein said switching control means is adapted to switch the reading operation of the print font data from said detachable font cartridge from the on state to the off state, by monitoring the open/closed state of a cover of the printing apparatus.

3. A printing apparatus according to claim 1, wherein said switching control means is adapted to switch the reading operation of the print font data from said detachable font cartridge from the off state to the on state, by monitoring the open/closed state of a cover of the printing apparatus.

4. A printing apparatus according to claim 1, wherein said line setting means is a manually operable switch for switching the state of communication line from the on-line state to the off-line state or from the off-line state to the on-line state.

5. A printing apparatus according to claim 1, further comprising state notification means for notifying an operator of the state forcedly established by said line setting means.

6. A printing apparatus comprising:
   print data output means for outputting print data;
   print means connected to said print data output means for printing print data output from said print data output means on the basis of print font data stored in a detachable font memory;
   line setting means for establishing an on-line state or an off-line state in the communication line of said print data output means and said print means in the course of processing of the print data of said print data output means and said print means; and
   switching control means for storing the print font data previously supplied from the font memory and for enabling said apparatus to release or receive the font memory when the line state is changed by said line setting means from the on-line state to the off-line state, and for causing the stored print font data to be again used when the line state is changed by said line setting means from the off-line state to the on-line state.

7. A printing apparatus according to claim 6, wherein said line setting means establishes line state by monitoring the open/closed state of a cover of the printing apparatus for mounting or demounting the detachable font memory and said switching control means controls the connected state of the font memory by monitoring the open/closed state of said cover of the printing apparatus.

8. A printing apparatus according to claim 6, wherein said line setting means is a manually operable switch for switching the state of communication line from an on-line state to an off-line state or from the off-line state to the on-line state.

9. A printing apparatus according to claim 6, further comprising state notification means for notifying an operator of the state established by said line setting means.

10. A printing apparatus for receiving print data from a host apparatus and for printing the print data based on print font data stored in a detachable font cartridge, said apparatus comprising:
    line setting means for forcedly establishing one of an on-line state and an off-line state of data communication with the host apparatus; and
    switching control means for storing the print font data previously supplied from a detachable font cartridge and for enabling said apparatus to release or receive the font cartridge when the line state is changed by said line setting means from the on-line state to the off-line state, wherein the stored print font data can again be used when the line state is returned to the on-line state.

11. A printing apparatus comprising:
    print data output means for outputting print data;
    print means connected to said print data output means for printing print data output from said print data output means on the basis of print font data read from a detachable font memory;

line setting means for establishing an on-line state and an off-line state in a communication line between said print data output means and said print means; and switching control means for storing the print font data previously supplied from the font memory and for enabling said apparatus to release or receive the detachable font memory when the line state is changed by said line setting means from the on-line state to the off-line state, and for causing the stored print font data to be again used when the line state is changed by said line setting means from the off-line state to the on-line state.

12. A printing method for receiving print data from a host apparatus and printing the print data based on print font data stored in a detachable font cartridge, said method comprising the steps of:

line setting by forcedly establishing an on-line state or an off-line state in the data communication with the host apparatus in the course of processing of the print data in communication with the host apparatus; and storing the print font data previously supplied from a detachable font cartridge and enabling the release or reception of the font cartridge when the line state is changed in said line setting step from the on-line state to the off-line state, and causing the stored print font data to be again used when the line state is changed in said line setting step from the off-line state to the on-line state.

13. A printing method according to claim 12, wherein reading of the print font data from the detachable font cartridge is switched from the on-state to the off-state, in response to an open or closed state of a cover of a printing apparatus.

14. A printing method according to claim 12, wherein reading of the print font data from the detachable font cartridge is switched from the off-state to the on-state, in response to an open or closed state of a cover of a printing apparatus.

15. A printing method according to claim 12, wherein said line setting step is performed with a manually operable switch for switching the state of a communication line from the on-line state to the off-line state or from the off-line state to the on-line state.

16. A printing method according to claim 12, further comprising a step of notifying an operator of a state forcedly established in said line setting step.

17. A printing method comprising the steps of:
outputting print data from a print data output means;
printing, with print means connected to the print data output means, print data output in said print data outputting step on the basis of print font data stored in a detachable font memory;

line setting by establishing an on-line state or an off-line state in a communication line of the print data output means and the print means in the course of processing of the print data of the print data output means and the print means; and storing the print font data previously supplied from the font memory and enabling release or reception of the font memory when the line state is changed in said line setting step from the on-line state to the off-line state, and causing the stored print font data to be again used when the line state is changed in said line setting step from the off-line state to the on-line state.

18. A printing method according to claim 17, wherein in said line setting step a line state is established by monitoring the open/closed state of a cover of a printing apparatus for mounting or demounting the detachable font memory and the connected state of the font memory is controlled by monitoring the open/closed state of the cover of the printing apparatus.

19. A printing method according to claim 17, wherein in said line setting step a manually operable switch is used for switching the state of a communication line from an on-line state to an off-line state or from the off-line state to the on-line state.

20. A printing method according to claim 17, further comprising the step of notifying an operator of a state established in said line setting step.

21. A printing method for receiving print data from a host apparatus and for printing the print data based on print font data stored in a detachable font cartridge, said method comprising the steps of:

line setting by forcedly establishing one of an on-line state and an off-line state of data communication with the host apparatus; and storing the print font data previously supplied from a detachable font cartridge and enabling release or reception of the font cartridge when the line state is changed in said line setting step from the on-line state to the off-line state, wherein the stored print font data can again be used when the line state is returned to the on-line state.

22. A printing method comprising the steps of:
outputting print data with a print data output means;
printing, with print means connected to the print data output means, print data output from the print data output means on the basis of print font data read from a detachable font memory;

line setting by establishing one of an on-line state and an off-line state in a communication line between the print data output means and the print means; and storing the print font data previously supplied from the font memory and enabling release or reception of the detachable font memory when the line state is changed in said line setting step from the on-line state to the off-line state, and causing the stored print font data to be again used when the line state is changed in said line setting step from the off-line state to the on-line state.

* * * * *

UNITED STATES PATENT AND TRADEMARK OFFICE
CERTIFICATE OF CORRECTION

PATENT NO. : 5,171,092  
DATED : December 15, 1992  
INVENTOR(S) : Shigemitsu TASAKI It is certified that error appears in the above-indentified patent and that said Letters Patent is hereby corrected as shown below:

COLUMN 1:

Line 25, "in" should be deleted.

COLUMN 5:

Line 67, "bs" should read --bus--.

COLUMN 7:

Line 8, "FC2." should read --FC2--;

Line 12, "i" should read --it--;

Line 29, "namely" should read --namely,--;

Line 51, "lmap" should read --lamp--.

UNITED STATES PATENT AND TRADEMARK OFFICE
CERTIFICATE OF CORRECTION

PATENT NO. : 5,171,092
DATED : December 15, 1992
INVENTOR(S) : Shigemitsu Tasaki It is certified that error appears in the above-indentified patent and that said Letters Patent is hereby corrected as shown below:

Column 11, line 3, "establishing" should read --establishing one of--

Signed and Sealed this

Eighteenth Day of January, 1994

*Attest:*

BRUCE LEHMAN

*Attesting Officer*     *Commissioner of Patents and Trademarks*